Feb. 10, 1953     E. W. DAVIS     2,627,814
LUBRICANT PUMP
Filed June 14, 1947     2 SHEETS—SHEET 2
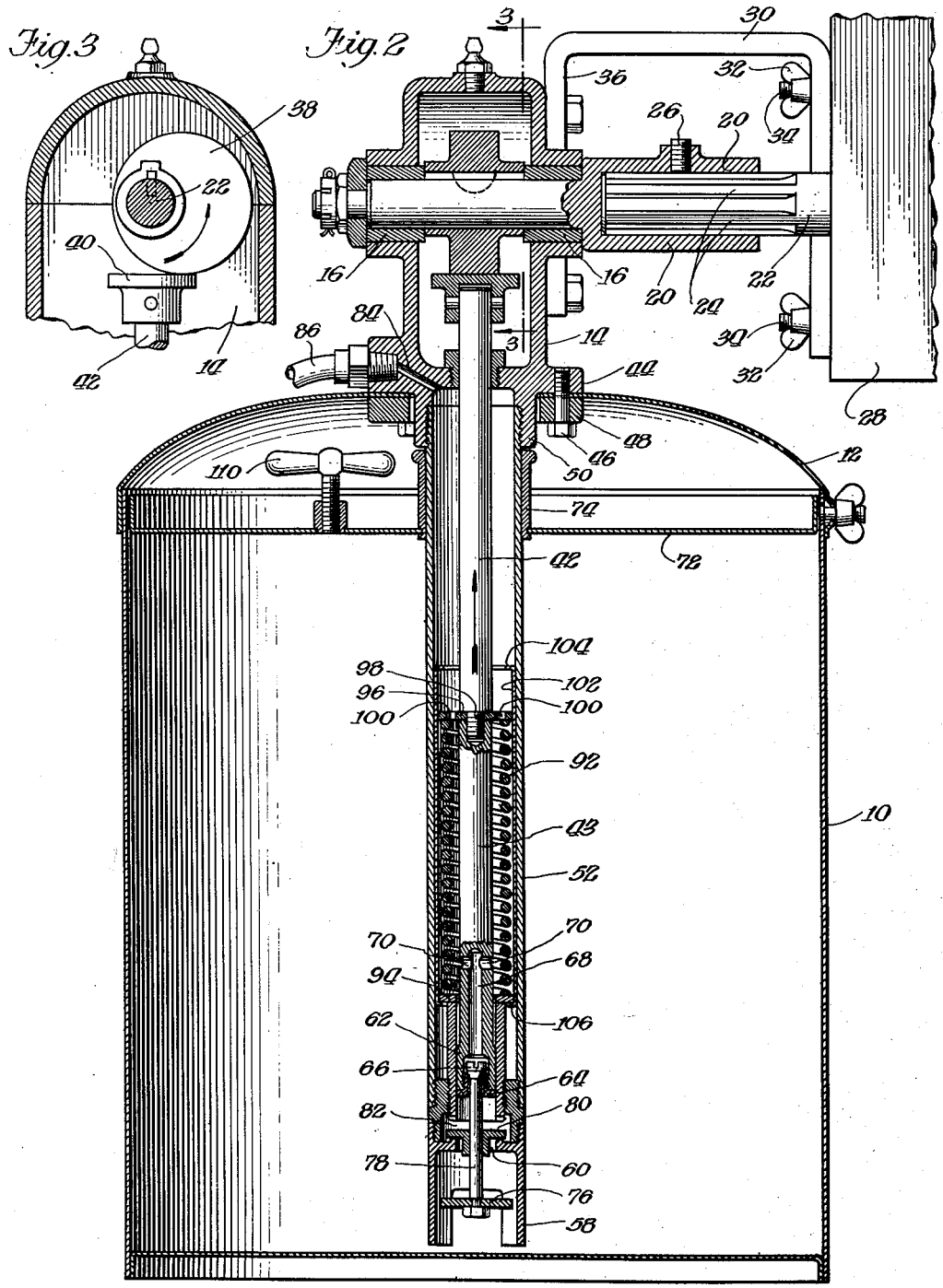
Inventor:
Ernest W. Davis
By: Hinkle, Horton, Ahlberg, Hansmann & Wupper
Attorneys Patented Feb. 10, 1953

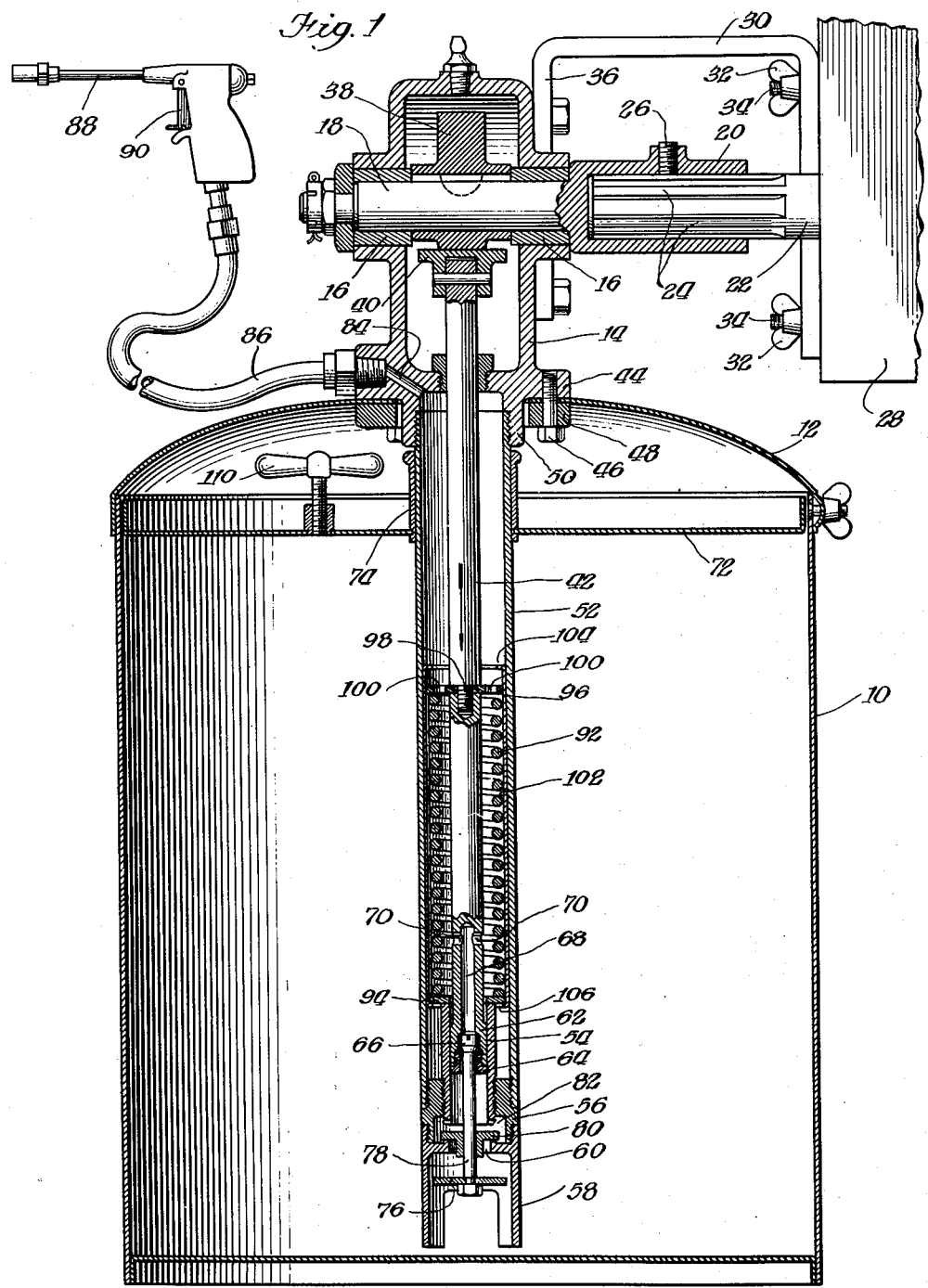

2,627,814

UNITED STATES PATENT OFFICE 2,627,814

LUBRICANT PUMP

Ernest W. Davis, River Forest, Ill.

Application June 14, 1947, Serial No. 754,641

2 Claims. (Cl. 103—37)

This invention relates to a portable type of lubricant pump particularly adapted for servicing machines or vehicles and arranged to use the power of the machine for operating the pump while it is delivering lubricant to the various bearings and other wearing surfaces of the machine.

One object of the invention is to provide a portable lubricant pump adapted to be driven from a convenient shaft of a machine such as the power take-off shaft of a conventional tractor.

Another object of the invention is to provide a power driven lubricant pump with means for automatically stalling the pumping mechanism when the lubricant pressure reaches a predetermined value, as, for example, when the delivery valve is closed.

More specifically it is an object of the invention to provide a power driven lubricant pump in which the pumping piston is automatically stalled in the position at which it is disconnected from the driving shaft when the lubricant pressure reaches a predetermined value, thereby permitting the shaft to continue running without any risk of damage to the pump.

It is also an object of the invention to provide a power driven lubricant pump with a one-way drive connection between the pumping piston and its operating shaft together with means for automatically stalling the piston at the limit of the stroke produced by such drive connection when the lubricant pressure produced by the pump reaches a predetermined value, as, for example, when the delivery line is closed.

Other objects and advantages of the invention will appear from the following description taken in connection with the drawings.

In the drawings:

Fig. 1 is a vertical sectional view of a portable lubricant pumping apparatus embodying this invention showing it mounted in the position of use coupled to a power shaft and provided with a flexible hose and valve controlled delivery nozzle for distributing lubricant to various parts of the machine from which the power shaft extends.

Fig. 2 is a vertical sectional view similar to Fig. 1 but showing the pump parts at an intermediate position in the course of a pumping stroke.

Fig. 3 is a fragmentary detail section taken as indicated at line 3—3 on Fig. 2.

In the form herein shown the portable lubricating device of this invention includes a tank or reservoir 10 having a cover 12 which is secured to and suspended from a housing 14 having bearings 16, 16 for a drive shaft 18. This shaft includes a hollow sleeve portion 20 which is formed for disengageable connection with a power shaft such as the power take-off shaft 22 formed with splines 24. The interior surface of the sleeve 20 is, therefore, splined for driving engagement with the shaft 22 and may be provided with the set screw 26, as shown. The frame or body portion 28 of the tractor, of which a fragment is shown in the drawings, is arranged for attachment of a bracket 30 as by means of wing nuts 32 engaging studs 34 to clamp the bracket against the tractor frame 28. Said bracket includes a depending arm 36 rigidly attached to the housing 14 and thus supporting the reservoir 10 and pumping mechanism contained therein and holding it against rotation about the axis of the drive shaft 18. This arrangement permits the pump and its reservoir 10 to be quickly removed by disengagement of the wing nuts 32 and disconnection of the sleeve 20 from the splined shaft 22.

The shaft 18 has keyed to it a circular eccentric cam 38 which operates against a follower in the form of a pad 40 on the upper end of the piston rod 42. The lower end of the housing 14 includes a flange 44 which is secured to the cover 12 of the reservoir 10 by means of clamp screws 46 extending through a clamp ring 48 on the underside of the cover; and said housing 14 also includes a threaded sleeve portion 50 depending within the cover 12 and connected to the casing 52 of the lubricant pump. The pump cylinder itself is shown at 54 threaded into a supporting fitting 56 which is screwed into the lower end of the casing 52 and which has a threaded depending portion supporting an extension 58 of the casing in which the inlet port 60 is formed. The pump piston 62 which reciprocates within the cylinder 54 is integral with the lower section 43 of the piston rod 42, and said piston carries a valve seat 64 at its lower end with a valve 66 adapted to seat downwardly thereon during the upward movement of the piston, as shown in Fig. 2, and to be unseated during the downward stroke of said piston, as shown in Fig. 1. The valve seat 64 controls a port in the lower end of the piston which leads into a passage 68 extending upwardly in the piston rod 43 and discharging laterally through ports 70 into the interior of the casing 52.

The reservoir is provided with the usual follower plate 72 guided on the casing 52 by means of a sleeve or hub 74 so that it shall move downwardly as the lubricant within the reservoir 10 is withdrawn, so as to maintain a quantity of lubricant adjacent the bottom of the pump. In the downward stroke of the piston a disc or plate 76 carried on the lower end of the stem 78 of the valve 66, as shown in Fig. 1, is pushed into the lubricant casing extension 58 in which the disc 76 is loosely fitted. Then, during the upward stroke of the piston, the plate or disc 76 moves upwardly in the extension 58 of the pump casing, and elevates lubricant past the foot valve 80 which seats over the port 60 just below the lower end of the pump cylinder 54. As the piston 62 commences its upward movement, the valve 66 moves against its seat and thereafter pulls the stem 78 and the priming plate 76 upwardly to cause the grease to flow past the inlet or foot valve 80. It will be noted that any friction between the stem 78 and valve 80 is always in a direction to supplement the pressure of the lubricant which is the main force causing operation of this valve. The chamber 82, to which the port 60 leads, and the lower portion of the pump cylinder 54 are thus filled with lubricant which is displaced by the downward movement of the piston 62 and forced past the valve 66 into the passage 68 and thence, by way of the ports 70, into the interior of the pump casing 52. This displaces and elevates lubricant already in the casing 52, discharging it through a passage 84 in the flange 44 of the housing 14 from which the delivery hose 86 extends to a discharge nozzle 88 having a suitable valve actuated by a trigger 90 for controlling the delivery of lubricant to the various bearings to be serviced.

The piston rod 42, 43 in its downward stroke is actuated by the eccentric cam 38 on the rotating shaft 18, but the return stroke is effected by means of a coil spring 92 which reacts between a disc or washer 94 seated on the upper end of the pump cylinder 54 and a disc 96 which constitutes a flange on the piston rod, being clamped between the adjacent ends of the sections 42 and 43 which are screwed together as seen at 98. Ports 100 in the disc 96 permit the passage of lubricant upwardly through the casing 52. Preferably, the spring 92 is enclosed in a cylindrical sheath 102 having inturned end flanges 104 and 106 which limit the expansion of the spring and permit it to be removed as a unit when the pump is disassembled. This arrangement permits installation of the spring 92 under an initial compression and prevents personal injury to anyone who may disassemble the pump without being aware of the energy thus stored up in the spring 92.

With the casing 52, passage 84, hose 86, and nozzle 88, filled with lubricant, it will be evident that lubricant will be promptly discharged whenever the valve which controls the nozzle 88 is opened; but upon closure of this valve the back pressure of lubricant in the pump will quickly stall the piston 62 at the lower limit of its range of movement, holding the spring 92 compressed and permitting the eccentric cam 38 to continue to rotate without any accompanying reciprocation of the piston. This action is insured by the fact that the diameter of the piston 62 is slightly greater than the diameter of the piston rod 42 so that the pressure of lubricant in the casing 52 tends to move the piston and the piston rod downwardly until these parts arrive at the lower limit of their stroke, with the pad 40 only slightly in contact with the high point of the eccentric cam 38. Immediately upon opening of the nozzle 88, this back pressure will be relieved, permitting the spring 92 to expand, thus causing an upward stroke, either partial or complete, of the piston 62 which will be followed by a downward stroke of the piston as the rotating eccentric cam 38 engages the follower pad 40. Thus, as long as the nozzle valve remains closed, the shaft 18 and its eccentric 38 may continue to rotate idly without actuating the pump piston 62, but as soon as any lubricant is released from the nozzle 88, the pump is operated to replace it with additional lubricant from the interior of the reservoir 10.

When the vehicle or machine to which the lubricating device is attached has been fully serviced, the equipment can be removed by detaching the bracket 30 from the frame or body 28 and disconnecting the coupling sleeve 20 from the shaft 22. When the supply of lubricant in the reservoir 10 is nearly exhausted, it may be conveniently replenished by detaching the cover 12 from the reservoir 10 and removing it therefrom by lowering it. If the casing 52 is thus pulled out of the guide sleeve 74 of the follower 72, the follower may be lifted out of the reservoir by means of a handle 110 and it will then be replaced over the new supply of lubricant when the reservoir has been refilled.

While there is shown and described herein certain structure embodying the invention and illustrative thereof, it is to be understood that the invention is not limited thereto or thereby but includes all modifications, variations, and equivalents which may come within the scope of the appended claims.

I claim:

1. In a fluid compressor, the combination comprising a pressure cylinder, a high pressure pump for delivering fluid thereto, a piston for said pump, a piston rod extending into said cylinder, continuously operating means for driving said piston rod and piston in one direction, a spring in said cylinder surrounding said piston rod, fixed abutment means in said cylinder and on said piston rod rendering the spring effective to drive said piston rod and piston in the opposite direction, a jacket surrounding said spring for limiting the expansion thereof, said jacket having a length at least equal to the maximum distance between the said two abutment means, and valve means including a valve controlling discharge of fluid from said compressor and a valve for trapping fluid on the high pressure side of said piston hydraulically to lock said piston and piston rod against movement under the influence of said spring when a predetermined pressure is exceeded in said cylinder.

2. In a fluid compressor, the combination comprising a pressure cylinder, a high pressure pump for delivering fluid thereto, a differential piston rod and piston for said pump extending into said cylinder, continuously operating means for driving said piston rod and piston in one direction, a compression spring for driving said piston rod and piston in the opposite direction, a jacket surrounding said spring for limiting expansion thereof, said jacket being of sufficient length to be ineffective to limit expansion of the spring within the range necessary for the operation of said pump, a discharge valve for controlling flow of fluid from said compressor, inlet check valve means admitting fluid to said cylinder when said piston rod and piston are moved under the influence of said continuously operating means, said inlet check valve means preventing reverse flow of fluid from the cylinder hydraulically to lock said piston rod and piston against movement under the influence of said spring when a predetermined pressure is exceeded in said cylinder, a priming plate, and a stem connecting the priming plate and the discharge valve and extending through the inlet valve.

ERNEST W. DAVIS.

REFERENCES CITED

The following references are of record in the file of this patent:

UNITED STATES PATENTS

| Number | Name | Date |
|---|---|---|
| 1,461,456 | Reynolds | July 10, 1923 |
| 1,715,522 | Townsend et al. | June 4, 1929 |
| 1,874,614 | Pilcher et al. | Aug. 30, 1932 |
| 1,981,667 | Rockwell | Nov. 20, 1934 |
| 2,071,615 | Creveling | Feb. 23, 1937 |
| 2,180,818 | Fields et al. | Nov. 21, 1939 |

FOREIGN PATENTS

| Number | Country | Date |
|---|---|---|
| 622,910 | France | Mar. 8, 1927 |